United States Patent [19]

Young

[11] Patent Number: 5,268,911
[45] Date of Patent: Dec. 7, 1993

[54] X-CUT CRYSTAL QUARTZ ACOUSTO-OPTIC MODULATOR

[76] Inventor: Eddie H. Young, 617 Spring Lake Dr., Melbourne, Fla. 32940

[21] Appl. No.: 14,354

[22] Filed: Feb. 5, 1993

Related U.S. Application Data

[63] Continuation of Ser. No. 728,131, Jul. 10, 1991, abandoned.

[51] Int. Cl.⁵ ............................................. H01S 3/11
[52] U.S. Cl. ......................................... 372/13; 372/26; 372/27; 385/1
[58] Field of Search ................. 372/13, 22, 21, 26; 385/1

[56] References Cited

U.S. PATENT DOCUMENTS

| | | | |
|---|---|---|---|
| 3,613,024 | 10/1971 | Coeusic et al. | 372/13 |
| 3,828,276 | 8/1974 | Cohen | 372/13 |
| 3,994,569 | 11/1976 | Issacs et al. | 372/13 |
| 4,308,506 | 12/1981 | Ellis | 372/13 |
| 4,630,275 | 12/1986 | Rapoport | 372/13 |
| 4,792,930 | 12/1988 | Kobayashi et al. | 372/13 |
| 4,928,284 | 5/1990 | Burns | 372/13 |
| 4,945,539 | 7/1990 | Bagshaw et al. | 372/13 |
| 4,979,176 | 12/1990 | Young et al. | 372/13 |
| 5,002,349 | 3/1991 | Cheung et al. | 385/101 |

OTHER PUBLICATIONS

Richard T. Webster; "X-Cut Quartz for Improved Surface Acoustic Wave Temperature Stability"; J. Appl. Phys 56(5); pp. 1540-1542; Sep. 1, 1984.

*Primary Examiner*—Léon Scott, Jr.
*Attorney, Agent, or Firm*—Charles E. Wands

[57] ABSTRACT

An acousto-optical laser modulator includes an X-cut crystal quartz block. A transducer, such as a piezoelectric device, is coupled to the block. An electrical signal provided to the transducer causes the transducer to vibrate. The vibrations propagate through the block as acoustic waves. A laser beam incident on the block may be refracted or diffracted by the acoustic waves. X-cut crystal quartz has various properties such as high thermal conductivity, low acoustic attenuation, high loss modulation efficiency, high drive power efficiency, and low angular sensitivity which make it well suited for applications in acousto-optical devices.

19 Claims, 10 Drawing Sheets

| | PHOTOELASTIC CONSTANTS | | FIGURES OF MERIT X $10^{-15}$ M$^2$/w | | |
|---|---|---|---|---|---|
| ANGLE θ (degrees) | X POLARIZED (perp) | (par) | X-CUT (perp) 100 PROP M2 VER | X-CUT (par) V2 = 5.75 HOR | Z-CUT 001 PROP M2 VERTICAL V = 6.32 |
| 0.000 | 0.290 | 0.160 | 2.396 | 0.729 | 1.564 |
| 5.000 | 0.298 | 0.160 | 2.531 | 0.729 | 1.564 |
| 10.000 | 0.305 | 0.160 | 2.659 | 0.729 | 1.564 |
| 15.000 | 0.312 | 0.160 | 2.777 | 0.729 | 1.564 |
| 20.000 | 0.318 | 0.160 | 2.879 | 0.729 | 1.564 |
| 25.000 | 0.322 | 0.160 | 2.962 | 0.729 | 1.564 |
| 30.000 | 0.326 | 0.160 | 3.023 | 0.729 | 1.564 |
| 35.000 | 0.328 | 0.160 | 3.058 | 0.729 | 1.564 |
| 40.000 | 0.328 | 0.160 | 3.066 | 0.729 | 1.564 |
| 45.000 | 0.327 | 0.160 | 3.047 | 0.729 | 1.564 |
| 50.000 | 0.325 | 0.160 | 3.001 | 0.729 | 1.564 |
| 55.000 | 0.321 | 0.160 | 2.931 | 0.729 | 1.564 |
| 60.000 | 0.316 | 0.160 | 2.840 | 0.729 | 1.564 |
| 65.000 | 0.310 | 0.160 | 2.731 | 0.729 | 1.564 |
| 70.000 | 0.303 | 0.160 | 2.608 | 0.729 | 1.564 |
| 75.000 | 0.295 | 0.160 | 2.477 | 0.729 | 1.564 |
| 80.000 | 0.287 | 0.160 | 2.342 | 0.729 | 1.564 |
| 85.000 | 0.278 | 0.160 | 2.207 | 0.729 | 1.564 |
| 90.000 | 0.270 | 0.160 | 2.077 | 0.729 | 1.564 |

FIGURE 3A

Y' PROPAGATING S$_i$O$_2$ LONGITUDINAL
ACOUSTIC WAVE IN X

| | PHOTOELASTIC CONSTANTS | | FIGURES OF MERIT X 10$^{-15}$ M$^2$/W | | |
|---|---|---|---|---|---|
| ANGLE θ (degrees) | X POLARIZED (perp) | (par) | X-CUT (PERP) 100 PROP M2 VER | X-CUT (PAR) V2 = 5.75 HOR | Z-CUT 001 PROP M2 VERTICAL V = 6.32 |
| 35.000 | 0.328 | 0.160 | 3.058 | 0.729 | 1.564 |
| 35.500 | 0.328 | 0.160 | 3.060 | 0.729 | 1.564 |
| 36.000 | 0.328 | 0.160 | 3.062 | 0.729 | 1.564 |
| 36.500 | 0.328 | 0.160 | 3.063 | 0.729 | 1.564 |
| 37.000 | 0.328 | 0.160 | 3.064 | 0.729 | 1.564 |
| 37.500 | 0.328 | 0.160 | 3.065 | 0.729 | 1.564 |
| 38.000 | 0.328 | 0.160 | 3.066 | 0.729 | 1.564 |
| 38.500 | 0.328 | 0.160 | 3.066 | 0.729 | 1.564 |
| 39.000 | 0.328 | 0.160 | 3.066 | 0.729 | 1.564 |
| 39.500 | 0.328 | 0.160 | 3.066 | 0.729 | 1.564 |
| 40.000 | 0.328 | 0.160 | 3.066 | 0.729 | 1.564 |
| 40.500 | 0.328 | 0.160 | 3.065 | 0.729 | 1.564 |
| 41.000 | 0.328 | 0.160 | 3.064 | 0.729 | 1.564 |
| 41.500 | 0.328 | 0.160 | 3.063 | 0.729 | 1.564 |
| 42.000 | 0.328 | 0.160 | 3.061 | 0.729 | 1.564 |
| 42.500 | 0.328 | 0.160 | 3.060 | 0.729 | 1.564 |
| 43.000 | 0.328 | 0.160 | 3.058 | 0.729 | 1.564 |
| 43.500 | 0.327 | 0.160 | 3.055 | 0.729 | 1.564 |
| 44.000 | 0.327 | 0.160 | 3.053 | 0.729 | 1.564 |

FIGURE 3B

X-CUT CRYSTAL QUARTZ ACOUSTO-OPTIC MODULATOR

This is a continuation of application Ser. No. 07/728,131, filed Jul. 10, 1991 now abandoned.

FIELD OF THE INVENTION

The present invention generally relates to the field of lasers, and more particularly to the field of acousto-optical devices for laser modulation.

BACKGROUND OF THE INVENTION

Acoustic waves, i.e., compression and expansion waves, travelling through solid and liquid materials are known to cause deformations in the materials at the molecular level. These deformations may affect other properties of the materials. For instance, materials which are transparent at certain frequencies of electromagnetic radiation, such as visible light, have an index of refraction. The indices of refraction of two different materials which abut each other may be used to calculate an angle of refraction of an incident beam of light or other radiation as it passes between the materials. The index of refraction of a material is one property of the material which may be affected by acoustic waves passing through the materials.

Acoustic waves may be generated in a piece of material, such as a crystal, electronically. A thin-film plate or piezoelectric transducer fixed to a side of the crystal converts an electrical signal into a mechanical vibration. This vibration propagates from the side through the crystal as an acoustic wave.

A beam of electromagnetic radiation, such as a laser beam, passing through the crystal is diffracted or refracted as though the crystal propagating acoustic waves were a diffraction grating or a prism. The degree of diffraction or refraction may be related to factors such as the magnitude, wavelength, etc., of the acoustic waves. Thus, the laser beam may be modulated as a function of the signal.

A very high frequency signal may be provided to the transducer. That signal itself may be amplitude- or frequency-modulated with a lower frequency signal. Thus, the laser output may be modulated with information over a wide range of frequencies such as from a few hertz to up to 100 MHz.

Devices including a block of transparent material having transducers mounted on their sides have been made for operation as described above. These conventional acousto-optical devices have been implemented using fused quartz or fused silica blocks. While these devices have been used in many applications, various properties inherent in the fused silica and fused quartz have limited their usefulness. These properties include the following:

1. Acoustic attenuation (should be as low as possible)
2. Thermal conductivity (should be as high as possible)
3. Q (should be as low as possible)
4. Loss modulation efficiency (should be as high as possible)
5. Drive power efficiency (should be as high as possible)
6. Angular sensitivity (should be as low as possible)

Limitations as to these properties have limited the usefulness and applications of acousto-optical devices.

SUMMARY OF THE INVENTION

It is thus an object of the invention to provide an acousto-optic device which substantially improves over the conventional devices with respect to the properties listed above.

To achieve improvement in the listed properties and to achieve other objects evident from the foregoing discussion, there is provided in accordance with the invention an apparatus for modifying a laser beam comprising an X-cut crystal quartz acousto-optical modulator.

As will be shown in the detailed description which follows, crystal quartz has properties which make it particularly well suited for use in acousto-optical devices, and a substantial improvement over fused silica.

BRIEF DESCRIPTION OF THE DRAWINGS

FIGS. 3A and 3B are tables showing data regarding properties of X-cut and Z-cut crystal quartz;

DETAILED DESCRIPTION OF THE PREFERRED EMBODIMENTS

Figure 1:
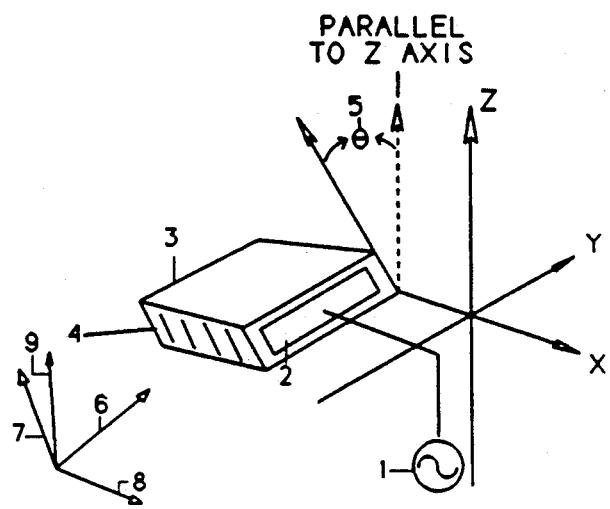
FIG. 1 is a schematic view of an acousto-optic device according to the invention, including rectangular coordinates to show orientation.

Referring first to FIG. 1, there is shown a schematic diagram of an X-cut crystal quartz acousto-optical modulator. To illustrate the orientation of the device, X, Y, and Z axes are provided.

In FIG. 1, an RF drive voltage input 1 provides a high frequency signal which may be amplitude- or frequency-modulated, etc., as required by the particular application to which the device is put. The signal is coupled to a longitudinal acoustic transducer 2, which may be a piezoelectric device. The transducer 2 is mounted onto an X-cut crystal quartz modulator block 3, in accordance with the invention. As the transducer 2 operates, it produces acoustic waves which propagate through the block 3, moving away from the transducer 2 in the X direction so that the acoustic waves propagate into the bulk of the X-cut crystal quartz modulator block. The acoustic waves are shown as 4. An angle $\theta$, shown as 5, shows the rotation of the crystal quartz modulator block 3 from the Z direction. Values for the angle $\theta$ are discussed below.

An incident optical wave, such as a laser beam, is shown as a vector 6. The wave 6 may be vertically polarized, parallel polarized, or randomly polarized. The latter includes both vertical and parallel components. The vertical, parallel, and random components are shown as vectors 7, 8, and 9, respectively. The vector 9 is thus the sum of the vectors 7 and 8.

Figure 2:
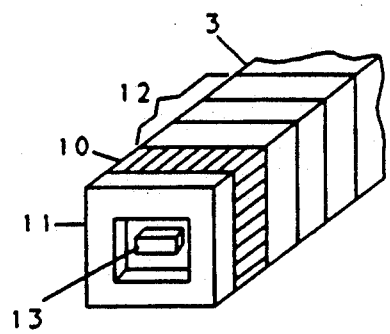
FIG. 2 is a perspective view of an acousto-optical device according to the invention.

FIG. 2 is a perspective view showing the structure of a modulator in more detail. The block 3 is made of an acousto-optic medium, crystal quartz in accordance with the invention. The piezoelectric transducer 2 includes a piezoelectric layer 10 sandwiched between a top electrode 11 and a bottom electrode 12. The bottom electrode 12 may include a metallic layer and a layer of bonding material for bonding the transducer 2 to the block of acousto-optical material 3. The top electrode 11 may include an active layer or contact 13 at which a drive signal is coupled to the transducer 2. The piezoelectric layer 10 vibrates responsive to the signal, and the vibration propagates into and through the bulk material of X-cut crystal quartz modulator block 3 as acoustic waves.

Experimentation and analysis has shown that, with respect to the various properties listed above, crystal quartz is advantageous over fused silica for implementing the block 3 in numerous respects. The acoustic attenuation at 1 GHz has been found to be 8.7 dB/μsec for fused silica. By contrast, crystal quartz, a nonisotropic material, has an acoustic attenuation of 2.46 dB/μsec for X-propagation, and 1.48 dB/μsec for Y-propagation. It will be seen that, for either orientation, crystal quartz has an advantageously lower attenuation than fused silica.

Heat may be generated in the crystal due to either friction from the acoustic waves or to the laser radiation. This heat may weaken the crystal or shorten its lifetime. In addition, the heating may change the properties of the crystal and affect the laser output by distorting the modulation, etc. Thus, the crystal should have the highest possible thermal conductivity so that any heat may be drawn off by heat sinks or other suitable means. The thermal conductivity of crystal quartz at 20° C. is $1.6 \times 10^{-2}$ cal/sec. cm. ° C., whereas that of fused silica at 25° C. is about a factor of 5 smaller, $3.3 \times 10^{-3}$ cal/sec. cm. ° C.

The performance of an acousto-optic laser modulator depends on the properties of the crystal or other transparent material, as well as the acoustic and optical wavelengths. A key parameter in this regard is commonly called the acousto-optical Q parameter, denoted as $Q_{AO}$. It is given by the following equation:

$$Q_{AO} = \frac{2\pi\lambda L}{n V_a^2} f_a^2 \tag{1}$$

In equation 1, n is the index of refraction, λ is the laser beam wavelength, L is the interaction length, $V_a$ is the acoustic velocity, and $f_a$ is the acoustic frequency.

The loss modulation efficiency of the device is inversely related to the $Q_{AO}$ of the device. As an example, a conventional fused silica Q-switch operated at a 27 MHz drive frequency and a 1.06 micron wavelength has a $Q_{AO}$ of 10.7, which corresponds to an efficiency of about 25%. By contrast, the $Q_{AO}$ for crystal quartz, all other parameters remaining the same, is 2.0, corresponding to a loss modulation efficiency of close to 50%. The lower $Q_{AO}$ for crystal quartz is partly due to a faster acoustic velocity $V_a$, 5.75 km/sec for crystal quartz compared with 3.76 km/sec for fused silica. In addition, the interaction length L is shorter for crystal quartz than for fused silica.

Another important parameter relating to the suitability of materials for use as an acousto-optical block is called the figure of merit. The figure of merit should be as high as possible for optimum performance.

The figure of merit $M_2$, is given by the following equation:

$$M_2 = \frac{p^2 n^6}{\rho v^3} \tag{2}$$

In equation 2, n is again the index of refraction (1.55 for crystal quartz), ρ is the density (2560 kg/m³ for crystal quartz), and v is the acoustic velocity (5750 m/sec for X-cut crystal quartz). The term p in equation 2 is a photoelastic constant, which for nonisotropic materials has a value related to the angle θ as shown in FIG. 1.

To understand the way in which p varies with the orientation of the block, it should first be recognized that the acoustic mode of the acoustic wave may be either longitudinal or shear. In addition, the polarization of the incident laser beam has an orientation with respect to the acoustic wave which can be perpendicular, parallel, or random, i.e., having both parallel and perpendicular components. For fused silica, the figure of merit is a constant with respect to the angle θ for parallel or perpendicular polarization in the longitudinal acoustic mode, and for random polarization in the shear mode. This is also true for Z-cut crystal quartz for perpendicular polarization, and for X-cut crystal quartz for parallel polarization.

However, it has been found that an X-cut crystal quartz device with a longitudinal acoustic mode and perpendicular polarization has a figure of merit which varies as a function of the angle θ. Moreover, by selecting a suitable value of θ, an advantageously high figure of merit may be achieved.

The following is an equation for calculating p as a function of θ:

$$p = 0.27 \sin^2(\theta) + 0.29 \cos^2(\theta) + 0.47 \sin(2\theta) \tag{3}$$

FIGS. 3A and 3B are tables of values for the photoelastic constant p for optical polarization perpendicular and parallel to the acoustic wave in X-cut crystal quartz, and the figure of merit $M_2$ as a function of θ for perpendicular and parallel polarization in X-cut crystal quartz and for Z-cut crystal quartz. All figures of merit listed are times $10^{-15}$ m²/w. It will be seen that Z-cut and X-cut crystal quartz blocks oriented for parallel polarization have constant, relatively small figures of merit. On the other hand, X-cut crystal quartz blocks oriented in perpendicular, when rotated about the X axis as shown in FIG. 1, produce relatively high figures of merit which vary as a function of θ. For advantageous operation, the angle θ should preferably be set such that the figure of merit is as high as possible, although any angle at which the figure of merit for X-cut crystal quartz exceeds 1.564 will provide superior performance compared with Z-cut crystal quartz.

FIG. 3A lists values at 5 degree intervals, over values of θ from 0 to 90 degrees. FIG. 3B lists values at ½ degree intervals over a 10 degree interval for which the photoelastic constant and the figure of merit for X-cut crystal quartz oriented for perpendicular polarization are highest. The figures of merit exceed 3.0 for θ=about 30° to 50°, and reach a maximum of 3.066 between 38° and 40°. It will be seen that these figures of merit for X-cut crystal quartz are higher than the non-θ-dependent values for Z-cut crystal quartz and parallel-oriented X-cut crystal quartz, and reach a particularly high value at an angle between 38° and 40°.

The maximum figures of merit of X-cut crystal quartz for a longitudinal acoustic mode and perpendicular polarization at an angle of 38° to 40°. are greater than the figure of merit for fused silica, 1.5 by a factor of about 3. Accordingly, a suitably oriented X-cut crystal quartz modulator would require only about ⅓ the drive power of a fused silica device for a given efficiency. On the other hand, for a given drive power, a crystal quartz modulator may produce an output proportionally greater than a comparable fused silica modulator.

An important application for crystal quartz laser modulators according to the invention is that of Q-switching. For instance, Q-switches may be used as laser output couplers in industrial materials processing applications. Typically, a Q-switch is disposed inside a laser cavity, a region between two inwardly reflecting mirrors containing a material which "lases" when excited. YAG lasers are commonly used for industrial applications. The Q-switch is essentially an on-off switch. An incident laser beam is either passed through the modulator block or cut off entirely. In an ON state, the Q-switch allows the laser beam to build up, moving back and forth between the mirrors. In an OFF state, the Q-switch introduces a loss mechanism by preventing the beam from moving freely. This is called loss modulation, and effectively kills the lasing process.

Figure 4:
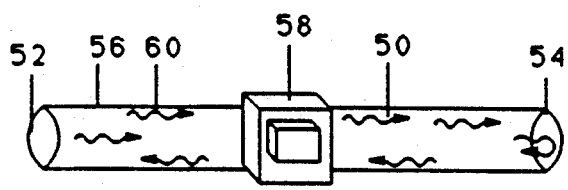
FIGS. 4 through 8 are schematic diagrams of laser systems employing laser modulators according to the invention as Q-switches.
Figure 5:
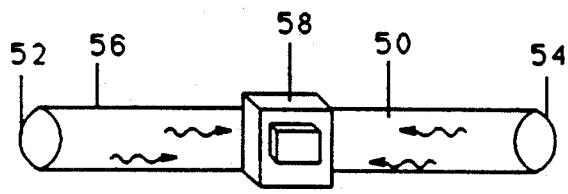

FIGS. 4 and 5 illustrate such an application. A laser cavity 50 is defined by first and second mirrors 52 and 54 and an enclosure 56. For gas lasers, the enclosure 56 may be a vessel for containing the gas. For lasers which use solids, such as crystalline materials, as the lasing medium, the enclosure 56 could be the outer surface or envelope of the lasing medium. A Q-switch 58 according to the invention is disposed in the cavity 50 between the mirrors 52 and 54.

FIG. 4 shows the operation of the laser device when the Q-switch is in the ON state. Photons 60 of laser energy travel back and forth through the cavity 50 and through the Q-switch 58. FIG. 5, however, shows the laser device after the Q-switch 58 has changed to the OFF state. Due to deflection of the photons 60 by the acoustic waves propagating through the Q-switch 58, the photons 60 no longer have a clear path back and forth between the mirrors 52 and 54. Thus, the lasing process is extinguished.

Figure 6:
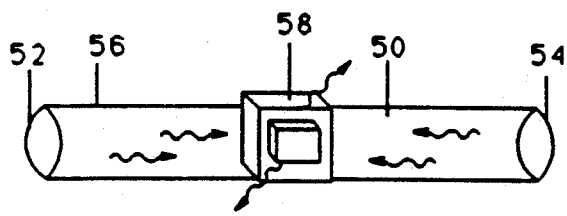

A similar application for devices according to the invention is that of cavity dumping. Instead of stopping the free flow of photons, the Q-switch is operated to refract the photons out of the laser cavity 50. This is illustrated in FIG. 6. As shown, photons 60 travelling axially through the laser cavity 50 are refracted as they pass through the Q-switch 58. The path of refraction takes the photons 60 diagonally out of the laser cavity. Again, lasing is stopped.

Another Q-switching application is mode locking. In an elongated laser cavity, there may be many longitudinal modes. When all of the longitudinal modes are in phase with each other, the laser output is in the form of output pulses. The pulses, or spikes, are produced at a frequency given by c, the velocity of light, divided by twice the length of the laser cavity. This frequency may typically be of the order of 100 MHz. In a mode locking application, output spikes of the highest possible power are desired. This may be achieved by using a Q-switch essentially as shown in FIGS. 4 through 6 to force all modes into phase.

Figure 7:
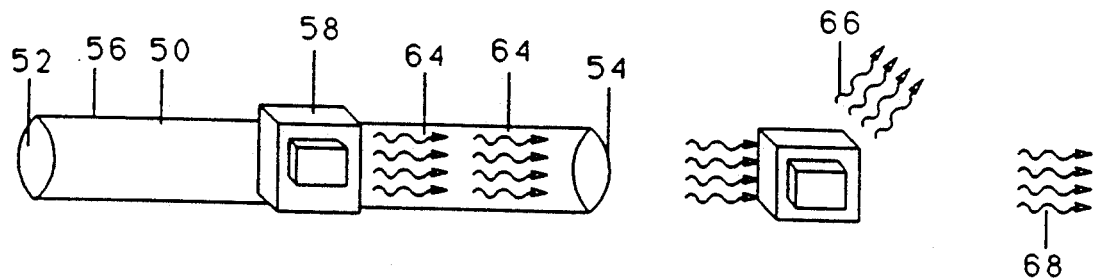

A related application is that of pulse picking. FIG. 7 shows a system similar to that of FIGS. 4 through 6, except that an external modulator 62 is disposed axially with and outside the laser cavity 50 behind the mirror 54. If the modulator 62 in FIG. 7 is disregarded, the remaining system is a mode locking system as described above. As shown, pulses 64 in the form of aligned photons move along the laser cavity 50 and emerge through the mirror 54, which is an output mirror slightly less reflective than the mirror 52. The pulses 64 emerge according to a frequency calculated as described above. The basic mode locking system may be modified to a pulse picking system by adding the modulator 62 as shown in FIG. 7 if a lower pulse frequency is desired. The external modulator 62 is controlled to deflect some of the pulses, such as the pulse 66, shown, and to allow other pulses, such as the pulse 68, to pass. By suitably controlling the modulator 62, a desired frequency or pattern of pulses may be produced. For instance, a frequency corresponding to an integral multiple of periods corresponding to the basic pulse frequency may be produced.

Figure 8:
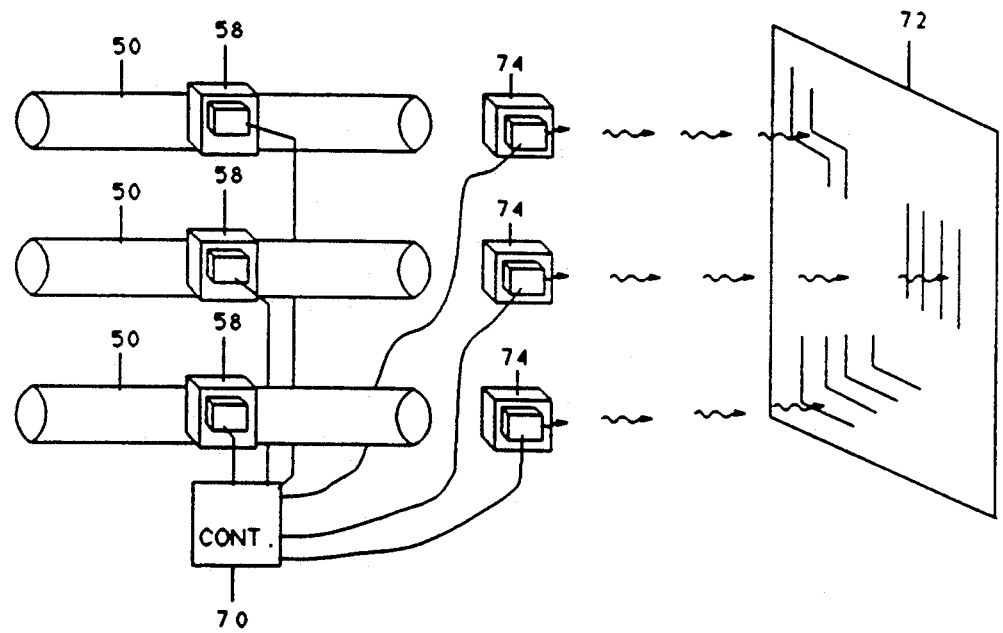

Modulators in accordance with the invention may also be used in multi-channel applications. FIG. 8 shows a plurality of laser cavities 50, each having a modulator 58 in accordance with the invention. The modulators 58 may be operated in parallel, for instance by a controller 70 coupled to the transducers of each of the Q-switches 58.

Laser systems of the types described above, particularly systems employing multichannel modulators or systems employing lasers in the UV wavelengths, may be used in applications such as semiconductor mask making, UV photoresist exposure, etc. In such applications, the laser beam is deflected along a predetermined geometry to trace the desired semiconductor mask or photoresist pattern, in a manner analogous to a plotter. As an example, FIG. 8 additionally shows a substrate 72. For the purposes of illustration, the substrate 72 could be either a semiconductor mask or a board having a layer of UV photoresist material. As shown, a parallel system having three laser cavities 50 may be used to etch a suitable geometric pattern on the substrate 72. Either the substrate 72 or the laser system may be moved up and down or from side to side to properly direct the laser beams. In a preferred embodiment, additional laser modulators 74 may be disposed outside the laser cavities to intercept and deflect the laser beams. A single controller 70 may be used to provide drive signals to both the Q-switches 58 and the additional modulators 74.

It will be seen that a modulator may experience high laser power densities. This is especially true in the mode locking and pulse picking applications, due to the high peak intensity pulses. Crystal quartz has good transmission properties which make crystal quartz modulators in accordance with the invention especially well suited for these applications. Even deep ultraviolet (UV) lasers may be modulated effectively using crystal quartz devices in accordance with the invention. The substantial increase in drive power efficiency as described above also shows that X-cut crystal quartz modulators are particularly well suited for Q-switch applications.

In addition to drive power efficiency, angular sensitivity is a particularly important property of Q-switches. The angular sensitivity of a crystal quartz acousto-optical Q-switch is about a factor of 2 to 2.5 less than that of a comparable fused silica device for the most common material processing lasers. This is because of the relatively high acoustic velocity of crystal quartz. Adjustment of a Q-switch is normally necessary for ensuring that the incident laser is fully cut off. The lower angular sensitivity of crystal quartz makes the adjustment less critical for a Q-switch employing crystal quartz in accordance with the invention.

Other applications are also available. Lasers in the high power UV, visible, and near infrared may be modulated using these devices. Beam deflection and beam scanning may be used for laser-controlled printers for computers, for audio and video disk playback systems, and for optical information disks for computer storage. Beam modulation can be used for data links and communications.

There are two important regimes for acousto-optic interactions. First, Raman-Nath diffraction occurs at relatively low frequencies when the acoustic beam width along the optical propagation direction is small. In this regime, the laser beam enters the medium parallel to the acoustic wavefronts. The diffracted light appears symmetrically on both sides of the primary beam at equally spaced angles. Second, Bragg diffraction occurs at higher frequencies where the acoustic beam width is larger. In this case, the diffracted light will appear predominantly in a single order. The intensity of the diffracted light will be at a maximum when the light is incident at the Bragg angle $\theta_B = \lambda/2n\Lambda$. The Bragg diffraction regime provides maximum performance for wide bandwidth acousto-optic devices and applications. Generally speaking, for $Q_{AO} < 1$, Raman-Nath diffraction dominates, while for $Q_{AO} > 7$, Bragg diffraction dominates.

Figure 9:
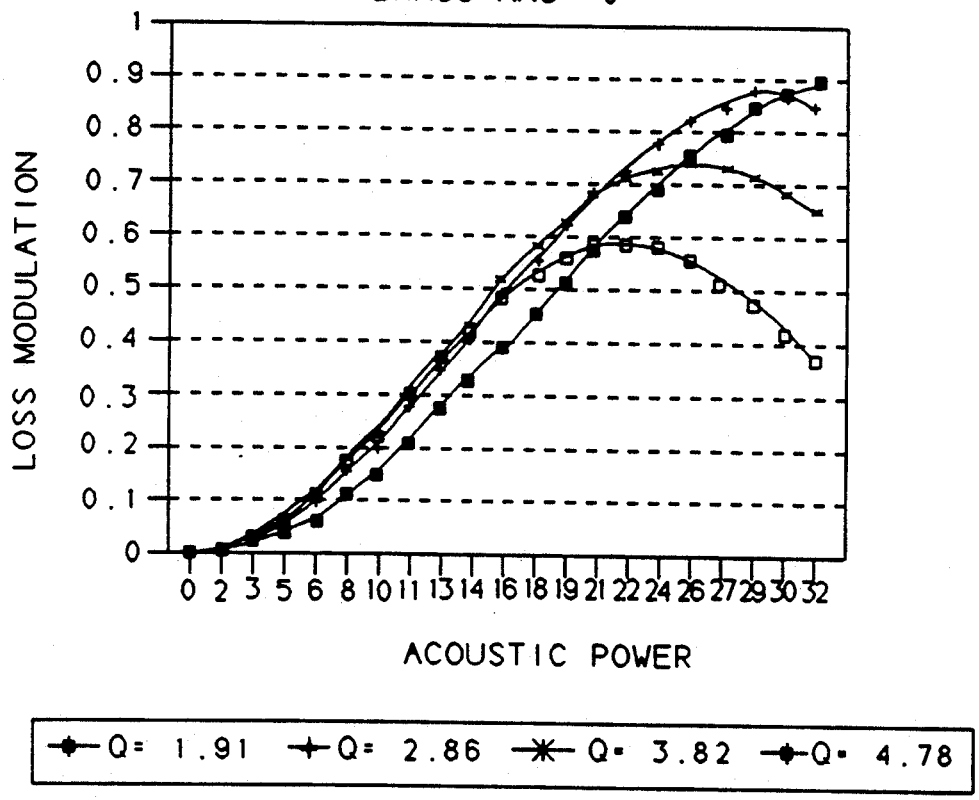
FIGS. 9 and 10 are graphs showing properties of crystal quartz.
Figure 10:
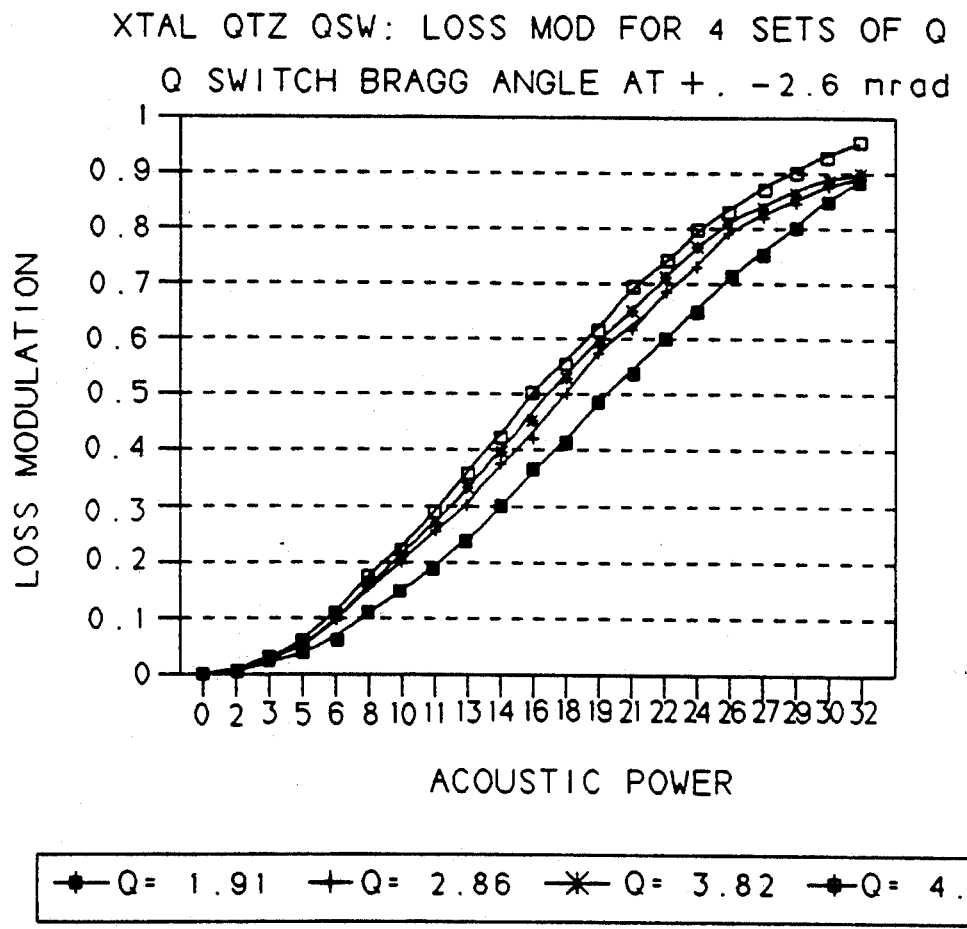
Figure 11:
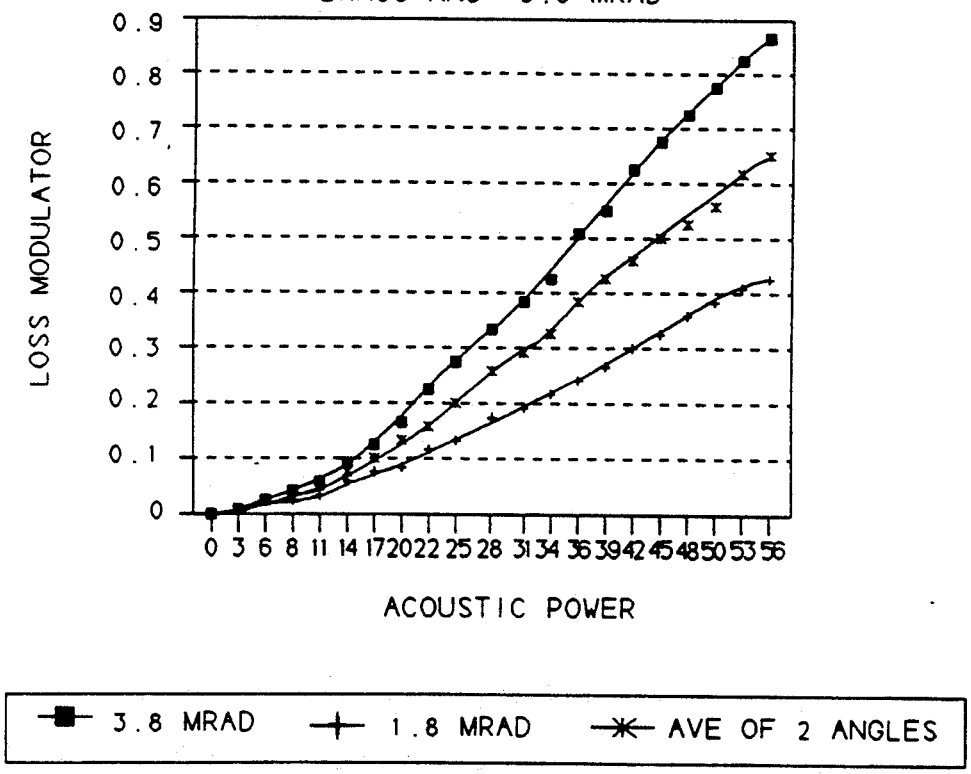
FIG. 11 is a graph showing properties of fused silica.

FIGS. 9 and 10 show graphs of loss modulation as a function of acoustic power of a crystal quartz device for various values of $Q_{AO}$ between 1 and 7 at two different Bragg angles. FIG. 11 is a graph of loss modulation as a function of acoustic power of a shear wave fused silica device for different Bragg angles for a typical $Q_{AO}$ of about 10.3.

The acoustic power applied to an acousto-optical device such as a Q-switch is related to a power density and the interaction length L. For a given acoustic power, as L increases, the power density decreases. The graphs of FIGS. 9 and 10 show loss modulation as a function of acoustic power for four different values of L. If the acoustic velocity is taken to be 5.785 km/sec and the acoustic frequency $f_a$ is taken to be 27 MHz, then the values of $Q_{AO}$ plotted correspond to the following L values:

| L (mm) | $Q_{AO}$ | Power Density W/mm$^2$ |
|---|---|---|
| 20 | 1.91 | .4 |
| 30 | 2.86 | .267 |
| 40 | 3.82 | .2 |
| 50 | 4.78 | .16 |

These graphs, particularly FIG. 9 (Bragg angle 0), show that a $Q_{AO}$ value of 2.86 provides good loss modulation at different input acoustic power levels while having an angular acceptance of greater than 4 mrad. For values of $Q_{AO}$ higher than 2.86, the loss modulation drops off as higher acoustic power levels are reached. The dropoff becomes particularly noticeable for values of $Q_{AO}$ greater than about 4.0. On the other hand, while the lower $Q_{AO}$ value of 1.91 also avoids the loss modulation dropoff, realizing a lower $Q_{AO}$ is impracticable because the increased power density increases the mechanical and thermal stresses on the modulator block and shortens its lifetime.

The foregoing analysis is applicable independent of the type of material used for the acousto-optical modulator block. Thus, the suitability of a material for use as a modulator block depends, in part, on how close to the optimal $Q_{AO}$ value the material can get. Crystal quartz is deemed to be a highly desirable substance for an acousto-optical modulator block because the optimal $Q_{AO}$ value may be realized using X-cut crystal quartz. By contrast, as stated above, conventional shear wave devices using fused silica have typically used a $Q_{AO}$ of about 10.3. Due to the relatively low $Q_{AO}$ values attainable with crystal quartz, crystal quartz devices may operate more in the Raman-Nath regime than the Bragg regime. Due to the different characteristics of Raman-Nath diffraction as opposed to Bragg diffraction described above, a crystal quartz device in accordance with the invention may achieve the same performance as a fused silica device with only about 70% of the drive power.

FIG. 11 shows a loss modulation vs. input acoustic power plot for two input angular divergence values, and an average for the two angles. These plots show that Q-switches employing crystal quartz in accordance with the invention require about 2.6 times less drive power than conventional fused silica shear wave devices. This may be seen by comparing the acoustic powers on the various curves corresponding with a given loss modulation value.

Figure 12:
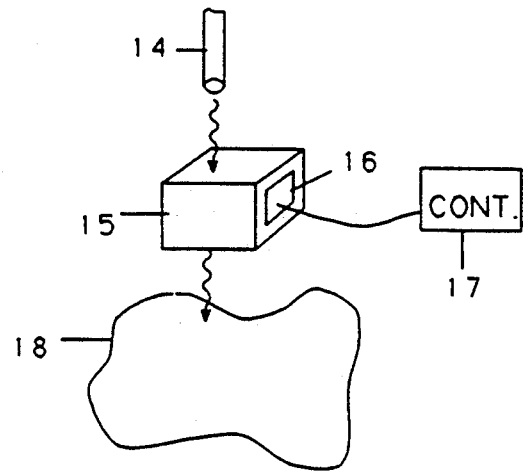
FIGS. 12 through 15 are system block diagrams of systems which employ X-cut crystal quartz acousto-optical devices according to the invention.

The following is a discussion of some applications for a device in accordance with the invention. First, FIG. 12 is a simplified block diagram of a materials processing system employing an X-cut crystal quartz Q-switch in accordance with the invention. A YAG laser 14 directs an incident beam onto a Q-switch 15 in accordance with the invention. The Q-switch 15 includes a transducer 16 which is coupled to receive a drive signal from a controller 17. The acoustic waves produced by the transducer 16 responsive to the drive signal switch the laser beam between ON and OFF states. In the ON state, the laser beam is directed at a piece of material 18 to be processed. This figure is a simplified schematic diagram, while FIG. 8 showed a more detailed and more specific example of a materials processing application, specifically semiconductor or photoresist etching.

Various types of laser scanning systems for scanning a scannable medium, i.e., directing a laser beam at a predetermined position on the scannable medium, may employ an X-cut crystal quartz laser modulator in accordance with the invention. Such scanners might include laser printers and laser disk devices such as audio or video disk players and computer data optical storage devices. The scannable medium could thus be a print medium such as paper or an optical storage medium such as a read/write or read-only laser disk.

Figure 13:
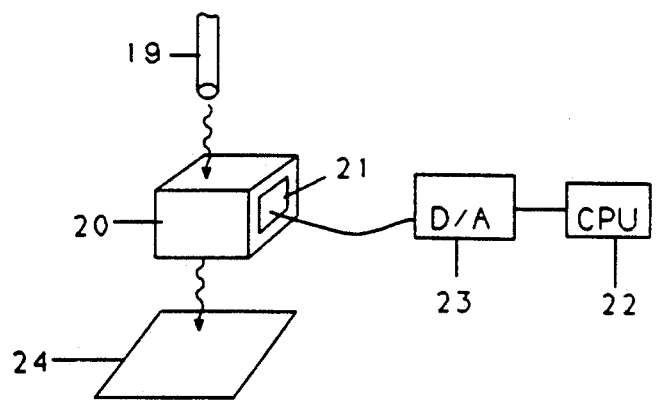

Turning to FIG. 13, there is shown another exemplary application of an X-cut crystal quartz laser modulator according to the invention. A laser printer for a computer includes a laser 19 which directs an incident beam onto a modulator 20. A transducer 21 on the modulator 20 receives a drive signal from a controller which could include, for instance, a CPU 22 and a D/A converter 23. Acoustic waves in the modulator 20 produced by the transducer 21 responsive to the drive signal deflect the incident beam onto a predetermined position on a print medium such as paper 24. The paper 24 may be moved along a path under the modulator 20 by a transport mechanism (not shown).

Figure 14:
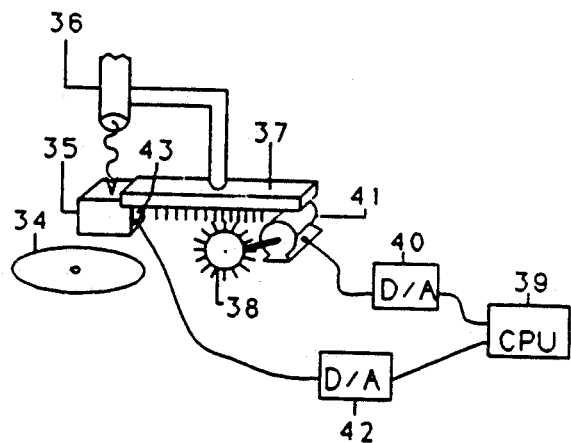

FIG. 14 is a system block diagram of a laser disk system which could be an audio or video disk playback system or a computer read/write optical data storage device. A laser disk 34 rotates adjacent to a head including a modulator 35 and a laser 36 coupled to a transport apparatus which might, for example, include a rack 37 and pinion 38. A controller might include a CPU 39 coupled through a D/A converter 40 to a motor 41 coupled to the pinion 38, and coupled through a D/A converter 42 to a transducer 43 on the modulator 35. A desired portion of the disk 34 may then be accessed by moving the transport apparatus to a desired radial part of the disk, and directing the laser beam through the modulator 35 by providing appropriate drive signals to the transducer 43 to diffract or refract the laser beam.

Figure 15:
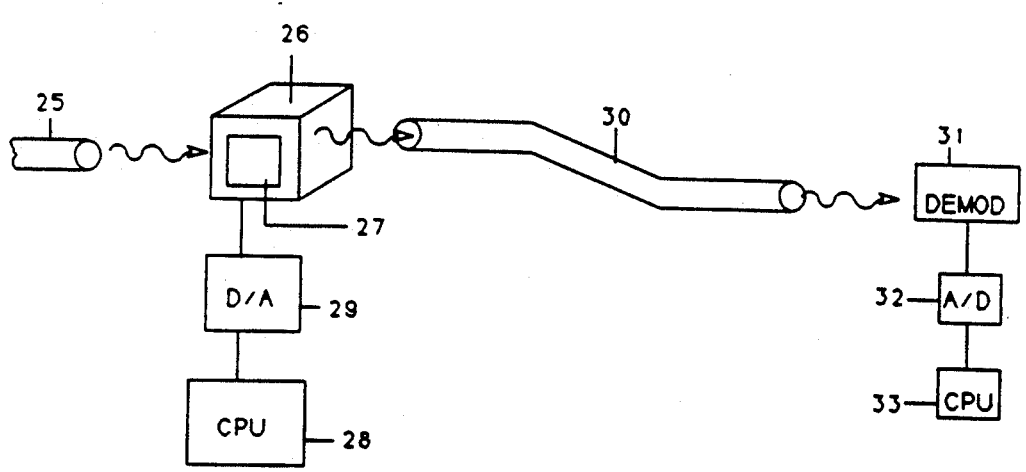

Finally, FIG. 15 is a system block diagram of a communications system employing an X-cut crystal quartz laser modulator according to the invention. A laser 25 directs an incident beam onto a modulator 26. The beam is modulated according to a drive signal provided to a transducer 27 from a controller such as a CPU 28 and D/A converter 29. The beam, modulated with information to be communicated to a remote station, directs the modulated beam onto a communication medium such a an optical fiber 30. At the remote location, a demodulator 31 receives the beam from the optical fiber 30, and provides the information extracted from the modulated beam to a receiver such as an A/D converter 32 and a CPU 33.

While I have shown and described an embodiment in accordance with the present invention, it is to be understood that the invention is not limited thereto, but is susceptible to numerous changes and modifications as known to a person skilled in the art. I therefore do not wish to be limited to the details shown and described herein, but rather intend to cover all such changes and modifications as would be obvious to a person skilled in the art based on the foregoing disclosure.

What is claimed is:

1. An acousto-optic modulator comprising a body of crystal quartz bulk material through which a laser beam to be modulated passes, and an acoustic wave launching transducer coupled to a first surface of said body of crystal quartz bulk material and being operative to launch a bulk acoustic wave away from said first surface and into the bulk material of said crystal quartz body, such that said bulk acoustic wave travels through the bulk material of said crystal quartz body and acousto-optically interacts with and thereby modulates said laser beam as said laser beam passes through said body of crystal quartz bulk material.

2. An acousto-optic modulator according to claim 1, wherein said body of crystal quartz bulk material is X-cut crystal quartz.

3. An acousto-optic modulator according to claim 2, wherein said laser beam is polarized at an angle which is perpendicular to the bulk acoustic wave launched by said bulk acoustic wave launching transducer.

4. An acoustic-optic modulator according to claim 3, wherein said laser beam passes through said body of crystal quartz bulk material at a prescribed angle relative to the Z axis of said body of crystal quartz bulk material, so as to obtain a prescribed figure of merit for said acousto-optic modulator.

5. An acousto-optic modulator according to claim 4, wherein said prescribed angle lies in a range on the order of 30°–50°.

6. An acousto-optic modulator according to claim 1, wherein said body of crystal quartz bulk material is X-cut crystal quartz bulk material, and wherein said bulk acoustic wave launching transducer is mounted to first surface of said X-cut crystal quartz body so as to launch a bulk acoustic wave that travels along the X-axis of X-cut crystal quartz bulk material X-axis.

7. An acousto-optic modulator according to claim 6, wherein said laser beam is polarized at an angle which is perpendicular to the direction of travel of the bulk acoustic wave launched by said bulk acoustic wave launching transducer, and wherein said laser beam passes through said body of X-cut crystal quartz bulk material at a prescribed angle lying in a range on the order of 30°–50°, relative to the Z axis of said body of X-cut crystal quartz bulk material, so as to obtain a prescribed figure of merit for said acousto-optic modulator.

8. A method of modulating a laser beam comprising the steps of:
(a) providing a body of crystal quartz bulk material;
(b) directing a laser beam upon a first surface of said body of crystal quartz bulk material so that said laser beam is diffracted into and passes through said body of crystal quartz bulk material; and
(c) launching a bulk acoustic wave away from a second surface of said body of crystal quartz bulk material and into the bulk material of said crystal quartz body, such that said bulk acoustic wave travels through the bulk material of said crystal quartz body and acousto-optically interacts with and thereby modulates said laser beam as said laser beam passes through said body of crystal quartz bulk material.

9. A method according to claim 8, wherein said body of crystal quartz bulk material is a body of X-cut crystal quartz bulk material.

10. A method according to claim 8, wherein (b) includes polarizing said laser beam at an angle which is perpendicular to said bulk acoustic wave, to thereby produce a perpendicularly polarized light beam.

11. A method according to claim 10, wherein step (b) further comprises orienting said body of crystal quartz bulk material at a prescribed angle relative to its Z axis, so as to obtain a prescribed figure of merit for said body of crystal quartz bulk material.

12. A method according to claim 11, wherein said prescribed angle lies in a range on the order of 30°–50°.

13. A Q-switch modulated laser device comprising a laser cavity containing a pair of reflectors and a laser medium disposed therebetween, said laser medium being stimulated to cause a laser beam to be generated therefrom, and wherein said laser cavity further includes a Q-switch for controllably extinguishing or allowing a laser beam to be generated and emitted from said laser cavity, said Q-switch comprising a body of crystal quartz bulk material through which said laser beam passes, and a bulk acoustic wave launching transducer coupled to a first surface of said body of crystal quartz bulk material and being operative to launch a bulk acoustic wave away from said first surface and into the bulk material of said crystal quartz body, such that said bulk acoustic wave travels through the bulk material of said crystal quartz body and acousto-optically interacts with and thereby controllably extinguishes said laser beam or enables said laser beam to be emitted from said laser cavity as said laser beam passes through said body of crystal quartz bulk material.

14. A Q-switch modulated laser device according to claim 13, wherein said body of crystal quartz bulk material is X-cut crystal quartz.

15. A Q-switch modulated laser device according to claim 14, wherein said laser beam is polarized at an angle which is perpendicular to the bulk acoustic wave launched by said bulk acoustic wave launching transducer.

16. A Q-switch modulated laser device according to claim 15, wherein said laser beam passes through said body of crystal quartz bulk material at a prescribed angle relative to the Z axis of said body of crystal quartz bulk material, so as to obtain a prescribed figure of merit for said acousto-optic modulator.

17. A Q-switch modulated laser device according to claim 16, wherein said prescribed angle lies in a range on the order of 30°-50°.

18. A Q-switch modulated laser device according to claim 13, wherein said body of crystal quartz bulk material is X-cut crystal quartz bulk material, and wherein said bulk acoustic wave launching transducer is mounted to first surface of said X-cut crystal quartz body so as to launch a bulk acoustic wave that travels along the X-axis of X-cut crystal quartz bulk material X-axis.

19. A Q-switch modulated laser device according to claim 18, wherein said laser beam is polarized at an angle which is perpendicular to the direction of travel of the bulk acoustic wave launched by said bulk acoustic wave launching transducer, and wherein said laser beam passes through said body of X-cut crystal quartz bulk material at a prescribed angle lying in a range on the order of 30°-50°, relative to the Z axis of said body of X-cut crystal quartz bulk material, so as to obtain a prescribed figure of merit for said acousto-optic modulator.

* * * * *